May 10, 1949.　　　　C. C. FUERST　　　　2,469,688
AUTOMATIC SHUTTER WITH BUILT-IN SYNCHRONIZER
Filed Dec. 19, 1944
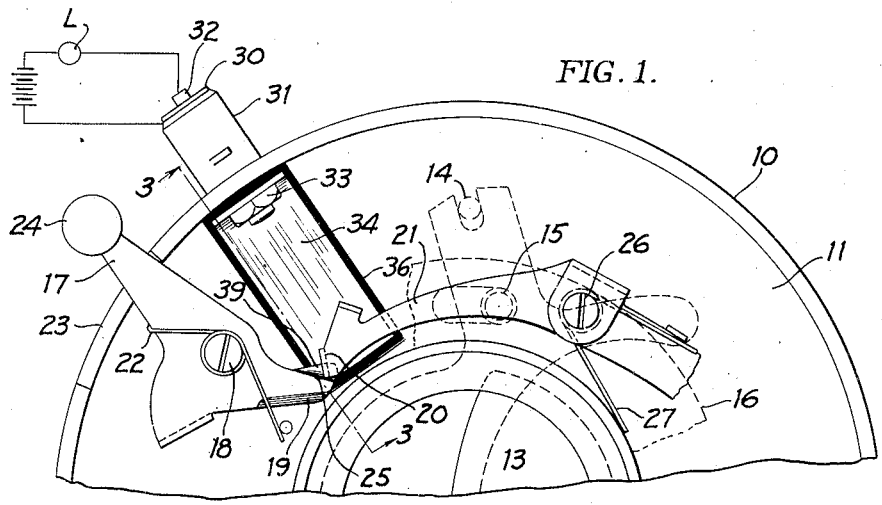
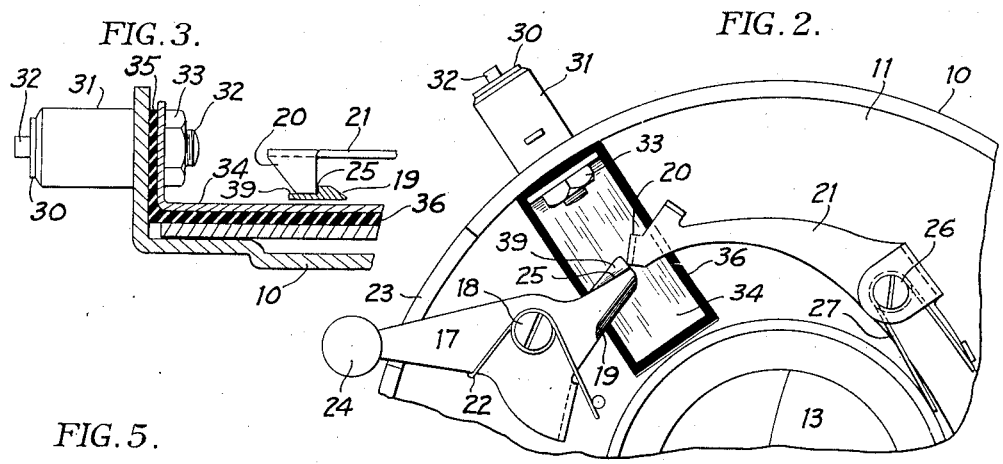
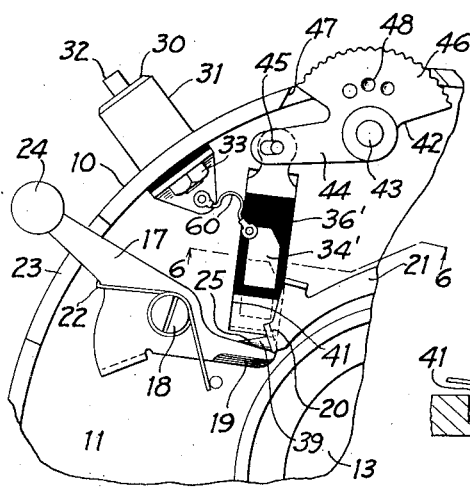
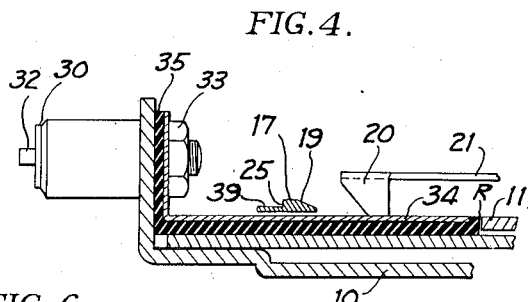
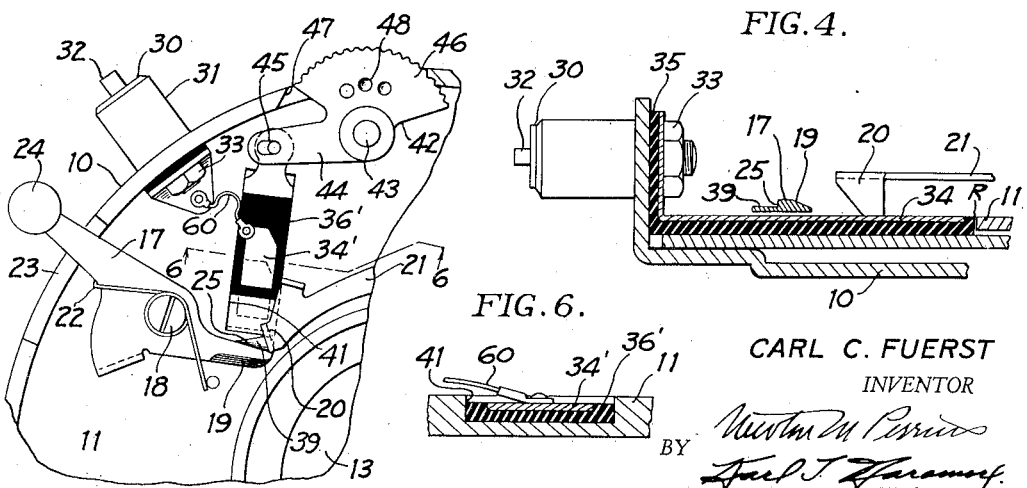
CARL C. FUERST
INVENTOR
BY
ATTORNEYS Patented May 10, 1949

2,469,688

UNITED STATES PATENT OFFICE 2,469,688

AUTOMATIC SHUTTER WITH BUILT-IN SYNCHRONIZER

Carl C. Fuerst, Rochester, N. Y., assignor to Eastman Kodak Company, Rochester, N. Y., a corporation of New Jersey Application December 19, 1944, Serial No. 568,824

6 Claims. (Cl. 95—11.5)

The present invention relates to photography, and particularly to a flashlight synchronizing device suitable for synchronizing the flashing of a lamp and the opening of a camera shutter when instantaneous exposures at high speeds are desired.

More specifically, the present invention relates to a flash synchronizing device which is built into, and constitutes a part of, a between-the-lens type of camera shutter of the automatic type as distinguished from shutters of the setting type.

One object of the present invention is the provision of a flash synchronizing device which can be added to conventional shutters of the automatic type without affecting the normal operation of such shutters in any way, but at the same time providing an efficient apparatus for the purpose in question.

Another object is the provision of a synchronizing apparatus of the type set forth which makes use of certain of the normal shutter parts and requires the addition of only a limited number of parts to the shutter and only a minor change in one of the shutter parts.

And yet another object is the provision of a synchronizing apparatus of the type set forth which is preferably arranged for use with a given type of flashlamp, but which can be easily rendered adjustable to take care of flashlamps having different "lag" or flashing characteristics if desired.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings in which;

Fig. 1 is a partial front view of a conventional automatic between-the-lens type of shutter, with the cover plate removed, and showing a flash synchronizer constructed in accordance with a preferred embodiment of the present invention incorporated in said shutter mechanism. In this figure, the trigger and master lever are shown in their normal, or inoperative, positions.

Fig. 2 is a view similar to Fig. 1 but showing the master lever moved to a cocked position by the trigger and at which point the lever is disengaged by the trigger, Fig. 3 is a section detail taken substantially on line 3—3 of Fig. 1, and showing the end of the master lever resting on the trigger, Fig. 4 is a sectional detail taken substantially on line 3—3 of Fig. 1, but showing the master lever after it has been disengaged by the trigger and is moving back to its cocked, or inoperative, position independently of the trigger, Fig. 5 is a view similar to Fig. 1, showing another modification of the flash synchronizing apparatus which permits adjustment of the closing time of the switch relative to the opening time of the shutter for adjusting the arrangement for use with flash lamps having different flashing characteristics, and Fig. 6 is a sectional detail taken substantially on line 6—6 of Fig. 5.

Like reference characters refer to corresponding parts throughout the drawings.

As is well known, all conventional flashlamps, with the exception of those of the gaseous discharge type, i. e. the Kodatron lamp, have a flashing characteristic which involves a known "lag," as the time lapsing from the instant of ignition to the instant the same reaches its peak of illumination is known as. The Kodatron lamp has no "lag," but reaches its peak of illumination the instant its circuit is closed. Many flash synchronizing arrangements have heretofore been devised and placed on the market, and many of these have been built into between-the-lens type of shutters. However, in order to take care of this "lag" characteristic, most of the synchronizers built into between-the-lens type of shutters have been associated with shutters of the setting type and the problem of closing the lamp circuit prior to the actual release of the shutter was solved by arranging one of the parts of the setting mechanism so that it would cause the lamp circuit to be closed prior to the shutter blades being operated.

In instances when it was desired to synchronize a flashlamp with an automatic between-the-lens type of shutter it has been the practice to use synchronizers which are not built into the shutter, but are in reality merely switch closing and shutter tripping units separate from the shutter. The very few instances in which an attempt has been made to incorporate the switch of a flash lamp circuit into an automatic shutter of the between-the-lens type have either disregarded the importance of the "lag" characteristics of flash lamps in synchronizing a flashlamp with the opening of the shutter, or have compromised on an arrangement of parts which took this "lag" characteristic into effect in a haphazard manner.

In accordance with the present invention, one part of the lamp circuit is connected to the master lever of an automatic shutter so that the end thereof constitutes one contact of a switch for closing the lamp circuit. This master lever is moved by a trigger from a normal inoperative position against the action of a spring to a cocked position wherein it is disengaged by said trigger and is allowed to return to its normal position. In returning to its normal position, this master lever causes the shutter blades to be fully opened, and they are in turn closed by another spring-driven mechanism. By arranging the second contact of the lamp switch so that it is adapted to be engaged by the end of the master lever after it has been moved to its cocked position and has been released by the trigger it is possible to insure the lamp circuit being closed a given time prior to the shutter being fully opened to account for the "lag" characteristics of given or different flash lamps. The trigger is arranged to engage and hold the master lever out of contact with the other switch contact at all times other than when the lever is moving from its cocked position to its normal or inoperative position.

Referring now to the drawings, the flash synchronizer constructed in accordance with the present invention is shown built into an automatic between-the-lens type of shutter of the well-known type and disclosed in U. S. Patent 1,663,178, Riddell, which was issued March 20, 1928. Inasmuch as the function and arrangement of the shutter operating mechanism so far as the present invention is concerned is the same as that disclosed in the noted Riddell patent, it has been deemed advisable, for the sake of clarity, to show in the present instance only those parts of the complete shutter mechanism which are essential to the functioning and/or an understanding of the present invention. The function and operation of the master lever so far as the shutter blade movement is concerned is the same as that disclosed in the Riddell patent, and in the present instance the mechanism associated with it for operating the blades has been omitted. In the present specification and drawings, the position of the blades and the several positions of the lever will be set forth but the Riddell patent is being relied upon for the structure necessary to such relationship.

As shown in Fig. 1 the present invention is associated with an automatic shutter of between-the-lens type which comprises a circular metal casing 10 for housing the mechanism, and which casing includes an annular mechanism plate 11 fixed to the peripheral wall of the casing and being spaced from both the top and bottom of the casing as is well known. The center of the shutter casing is provided with an exposure opening which is adapted to be closed by a plurality of shutter blades 13. The shutter blades are adapted to be opened and closed by a mechanism which is not important to the present invention but which is fully shown in the above-noted Riddell patent as including a fixed pivot on each of the blades and a movable fulcrum pin carried on extensions of an oscillatable blade ring. In Fig. 1 of the present case these parts for one blade are indicated in dotted lines, the fixed pivot being designated as 14, the movable fulcrum pin as 15, and the blade ring as 16. These parts are 8, 9, and 11, respectively, in the drawings of the noted Riddell patent. As the blade ring is moved back and forth the shutter blades are opened and closed in a well-known manner.

The blade ring operating mechanism includes a trigger 17 pivoted to the mechanism plate at 18 and provided with a knife edge 19 permitting it to slip under the downwardly turned abutment 20 on the end of a master lever 21 when said trigger is returned to its normal position, see Fig. 1, by a spring 22 coiled about its pivot. The normal position of the trigger is defined by the end of the slot 23 in the wall of the casing against which the fingerpiece 24 thereof comes to rest. When the trigger is manually depressed from the position shown in Fig. 1 to the position shown in Fig. 2 a shoulder 25 on the same engages the abutment 20 and rocks the master lever in a clockwise direction a prescribed distance, the lever finally slipping off of the trigger (see Fig. 2) and returning in the manner described.

The master lever 21 is pivoted at 26 to the mechanism plate 11 and is actuated by a spring 27 coiled about its pivot and having a long end engaged at a distant point, as fully shown and described in the noted Riddell patent, but not shown herein. By means of mechanism which is not essential to the present invention and is not shown herein, but is completely disclosed in the noted Riddell patent, the master lever is connected to the blade ring so that when it is moved from its inoperative position, or its position of rest (see Fig. 1) to its cocked position (see Fig. 2) the blades are not moved, but when moving from its cocked position back to its inoperative position under the action of spring 27 the blades are open, reaching their full open position when the master lever again reaches its inoperative position. From this point on another spring-driven mechanism, not shown herein, takes over to close the blades independently of the master lever.

It will thus be seen, that so far as an understanding of the present invention is concerned it is only necessary to remember that when the master lever 21 is moved from its inoperative position to its cocked position no movement of the blades takes place, but the spring 27 is only tensioned; and when moving from its cocked position back to its inoperative position the master lever causes an opening of the shutter blades. It is pointed out that the master lever is made of a resilient metal so that it can spring laterally of its length as the knife edge 19 on the trigger engages it during the return of the trigger to its normal position. Normally the abutment 20 of the master lever drops down and rides on the surface of the mechanism plate 11 when it is disengaged by the trigger.

Coming now to the present invention, I connect the master lever 21 to one side of the flashlamp circuit so that the abutment 20 thereof will act as one contact for the switch for closing the lamp circuit in proper timed relation to the opening of the shutter. To this end, I mount an electrical jack 30 on the wall of the shutter casing 10. This jack 30 is preferably of the type shown in my copending patent application, Serial No. 540,048, filed June 13, 1944, now Patent No. 2,405,741, issued August 13, 1946, and is so constructed that it is adapted to receive a female plug, not shown, connected to the leads of the lamp circuit in a bayonet lock type of connection. This jack includes an outer metal sleeve 31 which is connected to one side of the lamp circuit and which is grounded to the shutter casing so that the master lever 21 is in turn connected to the same side of the lamp circuit. This jack also includes a resilient center post 32 which is insulated from the sleeve and the shutter case, although it extends through the wall of the latter, and which is adapted to be connected to the other side of the lamp circuit.

Connected to the center post 32 of the jack by a nut 33 is an elongated L-shaped metal contact 34 which is adapted to constitute the second switch contact which the abutment 20 engages to close the lamp circuit. As clearly shown in Figs. 3 and 4, the contact 34 is insulated from the shutter casing 10 and mechanism plate 11 by insulating strips 35 and 36, respectively. The insulating strip 36 is positioned in a recess R in the mechanism plate so that the surface of the contact 34 lies flush with the surface of said mechanism plate, see Fig. 4.

To keep the switch in the lamp circuit open until the shutter is operated, the leading edge of the trigger is cut away in front of the shoulder 25 to provide a shelf 39 on which the abutment 20 rests in spaced relation with respect to the contact strip 34 until the shutter is tripped. When the trigger is moved to its tripping position, see Fig. 2, wherein it disengages the master lever, the abutment 20 drops down onto the metal contact strip 34 and rides thereover during the time the lever is returning to its inoperative position and the blades are being opened, see Fig. 4. This closes the lamp circuit, and if the time elapsing between the instant the abutment drops onto the metal strip and the instant it reaches its inoperative position in which the blades are fully open is equal to the "lag" characteristic of the flashlamp used, the lamp and shutter will be properly synchronized. When the trigger returns to its normal position, which is after the master lever does, the knife edge 19 thereof will cam the abutment 20 from the contact 34 and open the switch for a subsequent exposure.

The use of a fixed metal contact strip 34 as shown in Figs. 1–4 is designed for using a single type of flash lamp since it is capable of accounting for only one "lag" characteristic. If, for example, the shutter is to be used with a standard type of flashlamp having a 20-millisecond "lag" the metal contact 34 will be of such dimensions and will be so arranged relative to the path of movement of the abutment 20 that the abutment will engage and move thereover for a duration of 20 milliseconds before the master lever reaches its inoperative position and at which time the shutter blades are fully open.

In Figs. 5 and 6 is shown a modification of the synchronizing device which permits adjustment of the metal contact relative to the path of movement of the abutment 20 so that the shutter can be adjusted for use with flashlamps having different "lag" characteristics. In this modification the metal contact 34′, instead of being fixed as before, is mounted on a slide 36′ which is slidably mounted in a groove 41 formed in the top surface of the mechanism plate 11. In order to insulate the metal contact 34′ from the shutter casing and shutter mechanism the slide 36′ is made entirely of an insulating material, or as shown, may include a metal slide having the contact supporting end thereof made of insulating material. The metal contact 34′ is connected to the center post of the jack 30 by a flexible wire 60 which permits a necessary amount of adjustment of the contact.

When the metal contact 34′ is adjusted to the position shown in Fig. 5, the abutment 20 on the master lever (the second switch contact) will drop onto it the instant it is disengaged by the trigger and the longest "lag" characteristic (20 milliseconds) of a conventional type of flashlamp will be accounted for. When the metal contact 34′ is moved to its innermost position, shown in dotted line in Fig. 5, the abutment 20 will first drop onto an insulated part of the slide and will not engage the contact 34′ until the master lever 21 is nearer its inoperative position, or until the shutter blades are more nearly fully open. This innermost position of the contact 34′ can, therefore, account for the shorter "lag" (4 milliseconds) which is characteristic of another well-known type of flashlamp.

In order to facilitate the adjustment of the contact 34′ and make it possible for the camera user to adapt the shutter for use with any type of conventional flashlamp he might desire to use, the adjusting mechanism shown in Fig. 5 is provided. This includes a bellcrank member 42 pivoted at 43 to the mechanism plate 11. One arm 44 of the bellcrank member is connected to the end of the slide 36′ by a pin-and-slot connection 45. The other arm 46 of the bellcrank member which extends through a slot 47 in the vertical wall of the casing 10 is fan-shaped and has its edge roughened, as by knurling or the like, so that the bellcrank can be oscillated by the use of the thumb or fingers. Cooperating protuberances and detents provided on the face of the fan-shaped arm 46 of the bellcrank and the shutter casing, and indicated at 48, act to frictionally restrain the crank in any one of its several positions of adjustment to facilitate the positioning of the parts in any one of the several selected positions possible. The face of the fan-shaped arm of the bellcrank may be provided with a scale cooperating with an index on the shutter casing to indicate just what type of flashlamp the device is adjusted for in each of the selected positions of the bellcrank. In the position shown in Fig. 5 the bellcrank 42 is shown in one of its extreme positions and in which position the contact 34′ is adjusted to account for lamps of the type having the longest "lag" to be encountered, i. e. 20 milliseconds. As the bellcrank is moved counter-clockwise from this position the contact 34′ will be moved inwardly of the path of movement of the abutment 20 and in each successive position will account for lamps having slower "lag" characteristics, or as they are generally referred to, faster lamps.

It is believed that it will be apparent from the above description that I have provided a flash synchronizer for an automatic camera shutter which permits synchronization of the shutter with flashlamps having any one of a plurality of different "lag" characteristics. The arrangement disclosed requires only a very minor change in one of the existing parts of a conventional shutter and necessitates the addition of a minimum number of parts to the shutter. The synchronizer is in effect a component part of the shutter mechanism so that accurate timing and consistent successive results are possible. The synchronizer in no way affects the normal operation of the shutter so that it can be used without flashlamps in the normal way without encountering any operating difficulty.

Although I have shown and described certain specific embodiments of my invention, I am fully aware that many modifications thereof are possible. My invention, therefore, is not to be limited to the precise details of construction shown and described but is intended to cover all modifications coming within the scope of the appended claims.

Having thus described my invention, what I claim is new and desire to secure by Letters Patent of the United States is:

1. In a flashlight synchronizing device the combination of a between-the-lens photographic shutter of the automatic type comprising a casing housing an oscillatable blade ring for opening and closing the shutter when moved between its two positions; a blade ring operating mechanism in said casing including a master lever movable between a cocked position and an inoperative position, and adapted to be connected to one side of a lamp circuit to constitute a switch contact; a trigger for engaging and moving said lever from its inoperative position to its cocked position and then releasing it; a projection on said lever moving over a given path as the lever moves between its two positions; a stationary contact adapted to be connected to the other side of said circuit and located in said casing adjacent the master lever and embracing the path of movement of said projection; said projection movable to-and-from an operative position in which it is in wiping engagement with said second contact during movement of said lever; means normally moving said projection into said operative position, and means associated with said trigger to be moved thereby for moving said projection from, and holding it out of, said operative position when said lever is in its inoperative position and until it is moved to its cocked position, whereupon it is adapted to release said projection to allow it to return to its operative position during movement of the lever from its cocked position to its inoperative position.

2. A flash synchronizing device according to claim 1 in which said stationary contact is adjustably mounted in said casing relative to the path of movement of said master lever for varying the time of contact between the same and the projection on said lever in accordance with flash lamps having different "lag" characteristics.

3. A flash synchronizing device according to claim 1 in which said projection on the master lever is directly engaged by a part of said trigger to be moved from, and held out of, said operative position.

4. In a flash light synchronizing device the combination of a between-the-lens photographic shutter of the automatic type comprising a casing housing a shutter operating mechanism including a spring loaded master lever movable between a cocked position and an inoperative position and adapted to be connected to one side of a lamp circuit to constitute a switch contact, a stationary contact adapted to be connected to the other side of said circuit and disposed in said casing below and in the path of movement of part of said master lever, means normally moving said lever into wiping engagement with said stationary contact, a trigger for engaging and moving said lever from its inoperative position to its cocked position and then releasing it, and movable between an inoperative and a tripping position, said trigger adapted to positively engage and move said lever away from, and hold it out of contact with, said stationary contact during the time said lever is in its inoperative position and until the trigger is moved to its tripping position.

5. In a flashlight synchronizing device the combination of a between-the-lens photographic shutter of the automatic type comprising a casing housing a shutter operating mechanism including a spring operated master lever movable between a cocked position and an inoperative position and adapted to be connected to one side of a lamp circuit to constitute a switch contact, a stationary switch contact adapted to be connected to the other side of said circuit and disposed in said casing below and in the path of movement of said lever, means normally moving said lever into wiping engagement with said stationary contact, a trigger for moving said master lever from its inoperative position to its cocked position and then releasing it, and means operatively connected with said trigger to move therewith for engaging and holding said lever out of engagement with said stationary contact until it is moving from its cocked position to its inoperative position.

6. A flashlight synchronizing device according to claim 5 in which said last-mentioned means comprises a cam portion on the trigger which is adapted to engage and move the lever transversely away from said stationary contact when it returns to its inoperative position, and said trigger includes a shelf spaced above said stationary contact onto which the lever is adapted to drop and be spaced from said stationary contact until the trigger is moved to its tripping position, whereupon it is released to engage said stationary contact with a wiping action during its return to its inoperative position.

CARL C. FUERST.

REFERENCES CITED

The following references are of record in the file of this patent:

UNITED STATES PATENTS

| Number | Name | Date |
| --- | --- | --- |
| 1,932,098 | Boesser | Oct. 24, 1933 |
| 2,145,917 | Boesser | Feb. 7, 1939 |
| 2,290,362 | Springer | July 21, 1942 |
| 2,298,107 | Carr | Oct. 6, 1942 |
| 2,404,526 | Pirwitz | July 23, 1946 |